United States Patent [19]
Young et al.

[11] Patent Number: 5,809,536
[45] Date of Patent: Sep. 15, 1998

[54] METHOD FOR REDUCING THE NUMBER OF COHERENCY CYCLES WITHIN A DIRECTORY-BASED CACHE COHERENCY MEMORY SYSTEM UITILIZING A MEMORY STATE CACHE

[75] Inventors: Gene F. Young; Roy M. Stevens, both of Lexington; Larry C. James, West Columbia, all of S.C.

[73] Assignee: Intel Corporation, Inc., Santa Clara, Calif.

[21] Appl. No.: 763,703

[22] Filed: Dec. 9, 1996

[51] Int. Cl.$^6$ .............................. G06F 12/08; G06F 12/14
[52] U.S. Cl. ........................... 711/144; 711/145; 711/119; 711/120; 711/130
[58] Field of Search ...................................... 711/119, 120, 711/126, 130, 141, 144, 145, 148, 152, 156, 163

[56] References Cited

U.S. PATENT DOCUMENTS

| | | |
|---|---|---|
| 4,394,731 | 7/1983 | Flusche et al. . |
| 4,410,944 | 10/1983 | Kronies . |
| 4,775,955 | 10/1988 | Liu . |
| 4,928,225 | 5/1990 | McCarthy et al. . |
| 5,097,409 | 3/1992 | Schwartz et al. ........................ 711/145 |
| 5,191,649 | 3/1993 | Cadambi et al. .................. 395/200.55 |
| 5,226,144 | 7/1993 | Moriwaki et al. . |
| 5,291,442 | 3/1994 | Emma et al. ............................ 711/120 |
| 5,293,602 | 3/1994 | Fukagawa et al. . |
| 5,313,609 | 5/1994 | Baylor et al. . |
| 5,317,716 | 5/1994 | Liu . |
| 5,398,325 | 3/1995 | Chang et al. . |
| 5,450,563 | 9/1995 | Gregor . |
| 5,522,057 | 5/1996 | Lichy ...................................... 711/144 |
| 5,524,212 | 6/1996 | Somani et al. ........................ 364/228.7 |

FOREIGN PATENT DOCUMENTS

| | | |
|---|---|---|
| 5-158793 | 12/1991 | Japan . |
| 6-208507 | 1/1993 | Japan . |
| 6-274416 | 3/1993 | Japan . |
| 7-210526 | 1/1994 | Japan . |

*Primary Examiner*—Tod R. Swann
*Assistant Examiner*—J. Peikari
*Attorney, Agent, or Firm*—Blakely, Sokoloff, Taylor and Zafman, LLP

[57] ABSTRACT

An improved method for performing state cache line replacement operations in a multiprocessor computer system including plurality if data cache memories, a shared system memory, a state cache memory, and employing a centralized/distributed directory-based cache coherency system for maintaining consistency between lines of memory within the shared system memory and the plurality of data cache memories. The method for performing state cache line replacement operations includes the steps of: establishing a default system memory line state of SHARED for lines of memory represented in said state cache memory; reading the system memory line state for a previously stored state cache entry prior to a replacement of said previously stored state cache entry, said previously stored state cache entry being associated with a line of memory stored in said shared memory and at least one data cache memory; and performing a castout operation to update the line of memory within said shared memory and assigning a data cache memory line state of SHARED to said line of memory in each data cache memory containing said line of memory if said system memory line state for said previously stored state cache entry is OWNED. Since most lines of memory are in a shared state prior to replacement, setting the default state to a shared state, rather than a uncached state, reduces the number of invalidate coherency operations which must be performed during state cache line replacements.

3 Claims, 10 Drawing Sheets

REPLACED LINE ACTIONS

| REPLACED LINE STATE | DEFAULT STATE | | | |
|---|---|---|---|---|
| | UNCACHED | SHARED BOTH | SHARED A | |
| UNCACHED | NONE | N/A | N/A | |
| SHARED AGENT A | AGENT A INVALIDATE | NONE | NONE | |
| SHARED AGENT B | AGENT B INVALIDATE | NONE | AGENT B INVALIDATE | |
| SHARED BOTH | BOTH INVALIDATE | NONE | AGENT B INVALIDATE | |
| OWNED AGENT A | AGENT A CASTOUT – INVALIDATE | AGENT A CASTOUT – SHARED | AGENT A CASTOUT – INVALIDATE | |
| OWNED AGENT B | AGENT B CASTOUT – INVALIDATE | AGENT B CASTOUT – SHARED | AGENT B CASTOUT – INVALIDATE | |

FIG. 5A

THREE-BIT COHERENCY STATE TABLE DEFAULT STATE: UNCACHED

| INITIAL STATE | | READ BY AGENT A | | READ BY AGENT B | | WRITE BY AGENT A | |
|---|---|---|---|---|---|---|---|
| | | ACTION | NEXT STATE | ACTION | NEXT STATE | ACTION | NEXT STATE |
| UNCACHED | U | NONE | S-A | NONE | S-B | NONE | O-A |
| SHARED AGENT A | S-A | NONE | S-A | NONE | S-AB | NONE (AGENT A LOCAL COHERENCY) | O-A |
| SHARED AGENT B | S-B | NONE | S-AB | NONE | S-B | AGENT B INVALIDATE | O-A |
| SHARED BOTH | S-AB | NONE | S-AB | NONE | S-AB | AGENT B INVALIDATE (AGENT A LOCAL COHERENCY) | O-A |
| OWNED AGENT A | O-A | AGENT A CASTOUT-SHARED** | S-A | AGENT A CASTOUT-SHARED | S-AB | AGENT A CASTOUT-INVALIDATE** | O-A |
| OWNED AGENT B | O-B | AGENT B CASTOUT-SHARED | S-AB | AGENT B CASTOUT-SHARED** | S-B | AGENT B CASTOUT-INVALIDATE | O-A |

** THESE ACTIONS MAY NOT BE NECESSARY FOR SOME PROTOCOLS.

FIG. 5B

| WRITE BY AGENT B | | DMA READ | | DMA WRITE | | COPYBACK | |
|---|---|---|---|---|---|---|---|
| ACTION | NEXT STATE | ACTION | NEXT STATE | ACTION | NEXT STATE | ACTION | NEXT STATE |
| NONE | O-B | NONE | U | NONE | U | — | — |
| AGENT A INVALIDATE | O-B | NONE | S-A | AGENT A INVALIDATE | U | — | — |
| NONE | O-B | NONE | S-B | AGENT B INVALIDATE | U | — | — |
| AGENT A INVALIDATE (AGENT B LOCAL COHERENCY) | O-B | NONE | S-AB | BOTH INVALIDATE | U | — | — |
| AGENT A CASTOUT-INVALIDATE | O-B | AGENT A CASTOUT-SHARED | S-A | AGENT A CASTOUT-INVALIDATE | U | NONE | U |
| AGENT B CASTOUT-INVALIDATE** | O-B | AGENT B CASTOUT-SHARED | S-B | AGENT B CASTOUT-INVALIDATE | U | NONE | U |

FIG. 6A

THREE – BIT COHERENCY STATE TABLE DEFAULT STATE: SHARED BOTH

| INITIAL STATE | | READ BY AGENT A | | READ BY AGENT B | | WRITE BY AGENT A | |
|---|---|---|---|---|---|---|---|
| | | ACTION | NEXT STATE | ACTION | NEXT STATE | ACTION | NEXT STATE |
| SHARED AGENT A | S – A | NONE | S – A | NONE | S – AB | NONE (AGENT A LOCAL COHERENCY) | O – A |
| SHARED AGENT B | S – B | NONE | S – AB | NONE | S – B | AGENT B INVALIDATE | O – A |
| SHARED BOTH | S – AB | NONE | S – AB | NONE | S – AB | AGENT B INVALIDATE* (AGENT A LOCAL COHERENCY) | O – A |
| OWNED AGENT A | O – A | AGENT A CASTOUT – SHARED** | S – A | AGENT A CASTOUT – SHARED | S – AB | AGENT A CASTOUT – INVALIDATE** | O – A |
| OWNED AGENT B | O – B | AGENT B CASTOUT – SHARED | S – AB | AGENT B CASTOUT – SHARED** | S – B | AGENT B CASTOUT – INVALIDATE | O – A |

\* SOME OF THESE INVALIDATES WILL NOT BE GENERATED FOR THE UNCACHED DEFAULT STATE PROTOCOL.
\*\* THESE ACTIONS MAY NOT BE NECESSARY FOR SOME PROTOCOLS.
\*\*\* IF THE IO INTERFACE IS LOCAL TO EITHER AGENT THEN INVALIDATES CAN BE HANDLED LOCALLY FOR THAT AGENT, FOR A LOCAL SNOOPING PROTOCOL, WITH THE MEMORY INVALIDATING THE OPPOSITE AGENT.

FIG. 6B

| WRITE BY AGENT B | | DMA READ | | DMA WRITE | | COPYBACK | |
|---|---|---|---|---|---|---|---|
| ACTION | NEXT STATE | ACTION | NEXT STATE | ACTION | NEXT STATE | ACTION | NEXT STATE |
| AGENT A INVALIDATE | O – B | NONE | S – A | AGENT A INVALIDATE | S – AB | — | — |
| NONE | O – B | NONE | S – B | AGENT B INVALIDATE | S – AB | — | — |
| AGENT A INVALIDATE* (AGENT B LOCAL COHERENCY) | O – B | NONE | S – AB | BOTH INVALIDATE* | S – AB | — | — |
| AGENT A CASTOUT – INVALIDATE | O – B | AGENT A CASTOUT – SHARED | S – A | AGENT A CASTOUT – INVALIDATE | S – AB | NONE | S – AB |
| AGENT B CASTOUT – INVALIDATE** | O – B | AGENT B CASTOUT – SHARED | S – B | AGENT B CASTOUT – INVALIDATE | S – AB | NONE | S – AB |

FIG. 7A

THREE-BIT COHERENCY STATE TABLE DEFAULT STATE: SHARED AGENT A

| INITIAL STATE | | READ BY AGENT A | | READ BY AGENT B | | WRITE BY AGENT A | |
|---|---|---|---|---|---|---|---|
| | | ACTION | NEXT STATE | ACTION | NEXT STATE | ACTION | NEXT STATE |
| SHARED AGENT A | S–A | NONE | S–A | NONE | S–AB | NONE (AGENT A* LOCAL COHERENCY) | O–A |
| SHARED AGENT B | S–B | NONE | S–AB | NONE | S–B | AGENT B INVALIDATE | O–A |
| SHARED BOTH | S–AB | NONE | S–AB | NONE | S–AB | AGENT B INVALIDATE* (AGENT A LOCAL COHERENCY) | O–A |
| OWNED AGENT A | O–A | AGENT A CASTOUT – SHARED** | S–A | AGENT A CASTOUT – SHARED | S–AB | AGENT A CASTOUT – INVALIDATE** | O–A |
| OWNED AGENT B | O–B | AGENT B CASTOUT – SHARED | S–AB | AGENT B CASTOUT – SHARED** | S–B | AGENT B CASTOUT – INVALIDATE | O–A |

\* SOME OF THESE INVALIDATES WILL NOT BE GENERATED FOR THE UNCACHED DEFAULT STATE PROTOCOL.
\*\* THESE ACTIONS MAY NOT BE NECESSARY FOR SOME PROTOCOLS.
\*\*\* IF THE IO INTERFACE IS LOCAL TO EITHER AGENT THEN INVALIDATES CAN BE HANDLED LOCALLY FOR THAT AGENT, FOR A LOCAL SNOOPING PROTOCOL, WITH THE MEMORY INVALIDATING THE OPPOSITE AGENT.

FIG. 7B

| WRITE BY AGENT B | | DMA READ | | DMA WRITE | | COPYBACK | |
|---|---|---|---|---|---|---|---|
| ACTION | NEXT STATE | ACTION | NEXT STATE | ACTION | NEXT STATE | ACTION | NEXT STATE |
| AGENT A* INVALIDATE | O – B | NONE | S – A | AGENT A* INVALIDATE | S – AB | — | — |
| NONE | O – B | NONE | S – B | AGENT B INVALIDATE | S – AB | — | — |
| AGENT A INVALIDATE (AGENT B LOCAL COHERENCY) | O – B | NONE | S – AB | BOTH INVALIDATE | S – AB | — | — |
| AGENT A CASTOUT – INVALIDATE | O – B | AGENT A CASTOUT – SHARED | S – A | AGENT A CASTOUT – INVALIDATE | S – AB | NONE | S – AB |
| AGENT B CASTOUT – INVALIDATE** | O – B | AGENT B CASTOUT – SHARED | S – B | AGENT B CASTOUT – INVALIDATE | S – AB | NONE | S – AB |

# 5,809,536

METHOD FOR REDUCING THE NUMBER OF COHERENCY CYCLES WITHIN A DIRECTORY-BASED CACHE COHERENCY MEMORY SYSTEM UITILIZING A MEMORY STATE CACHE

The present invention relates to multiprocessor computer systems having multiple data cache memories and a shared memory and, more particularly, to multiprocessor computer systems employing directory-based protocols for maintaining cache coherency.

BACKGROUND OF THE INVENTION

The past several years have seen near exponential increases in the performance, speed, integration density, and capacity of computer systems. These improvements coupled with the decrease in costs for computer systems, have resulted in more expansive utilization of computer systems the development of more sophisticated and resource intensive computer applications. According to recent historical trends, application memory requirements double yearly. Although the costs for computer systems and components has steadily declined in recent years, high speed RAM memory utilized in system main memory and cache memories remains one of the highest cost components within most computer systems.

System and cache memories, used primarily for the temporary storage of data, application software and operating system software, are also being utilized within more sophisticated multiprocessor systems for the storage of parity bits, cache coherency state information, and error detection and/ or correction syndrome bits. These additional memory requirements of multiprocessor systems, and the higher memory demands of advanced operating systems and applications, result in an increased demand, and cost, for high speed RAM.

More efficient methods for utilizing high speed system and cache memory, and for reducing system and cache memory requirements, are desired.

OBJECTS OF THE INVENTION

It is therefore an object of the present invention to provide a new and useful method for improving memory utilization within a computer system employing directory-based cache coherency.

It is another object of the present invention to provide such a method wherein cache state information is maintained within a dedicated cache memory thereby reducing system memory requirements.

It is still a further object of the present invention to provide a method for reducing the number of coherency operations within a directory-based cache memory system employing a cache memory for the storage of cache state information.

SUMMARY OF THE INVENTION

There is provided, in accordance with the present invention, an improved method for performing state cache line replacement operations in a multiprocessor computer system including plurality if data cache memories, a shared system memory, a state cache memory, and employing a centralized/distributed directory-based cache coherency system for maintaining consistency between lines of memory within the shared system memory and the plurality of data cache memories. Such a multiprocessor computer system is described in U.S. patent application Ser. No. 08/762,636, filed concurrently with the present application. U.S. patent application Ser. No. 08/762,636, entitled "Method and Apparatus for Caching State Information Within a Directory-Based Coherency Memory System," by Gene F. Young, Roy Stevens, and Larry James, is assigned to NCR Corporation.

Information concerning the state of a line of memory is maintained within the state cache memory and in the data cache memories. Each data cache memory contains a data cache memory line state with each line of memory saved within the data cache memory, the data cache memory line state being any one of the MESI (Modified-Exclusive-Shared-Invalid) states: MODIFIED, EXCLUSIVE, SHARED, or INVALID. The state cache memory contains a system memory line state for a predetermined number of lines of memory saved within the system memory, the system memory line state being any one of the following states: SHARED BUS A, SHARED BUS B, SHARED BOTH, OWNED BUS A and OWNED BUS B.

The method for performing state cache line replacement operations includes the following steps: establishing a default system memory line state of SHARED for lines of memory represented in said state cache memory; reading the system memory line state for a previously stored state cache entry prior to a replacement of said previously stored state cache entry, said previously stored state cache entry being associated with a line of memory stored in said shared memory and at least one data cache memory; and performing a castout operation to update the line of memory within said shared memory and assigning a data cache memory line state of SHARED to said line of memory in each data cache memory containing said line of memory if said system memory line state for said previously stored state cache entry is OWNED (OWNED BUS A or OWNED BUS B).

The described method reduces the number of coherency operations caused as a result of replacements in the state cache memory. Since most lines of memory are in a shared state, setting the default state to a shared state, rather than a uncached state, reduces the number of invalidate coherency operations which must be performed during state cache line replacements.

The above and other objects, features, and advantages of the present invention will become apparent from the following description and the attached drawings.

BRIEF DESCRIPTION OF THE DRAWINGS

FIGS. 6A and 6B provide a coherency state table for a three bit directory based memory having a "Shared Both"

default state in accordance with a first embodiment of the present invention.

DETAILED DESCRIPTION OF THE PREFERRED EMBODIMENT

NCR Corporation has developed an advanced multiprocessor architecture utilizing system techniques pioneered by NCR while also advantageously making use of standard high volume (SHV) components, such as Intel Pentium Pro processors, PCI I/O chipsets, Pentium Pro chipsets, Pentium Pro bus topology (P6), and standard memory modules (SIMMs and DIMMs). Through careful integration of NCR system techniques with standard SHV components, NCR is able to deliver world class scalability and feature content while still capitalizing on SHV and without the disadvantages associated with full custom development. One implementation of this architecture is shown in FIG. 1.

System Overview

Figure 1:
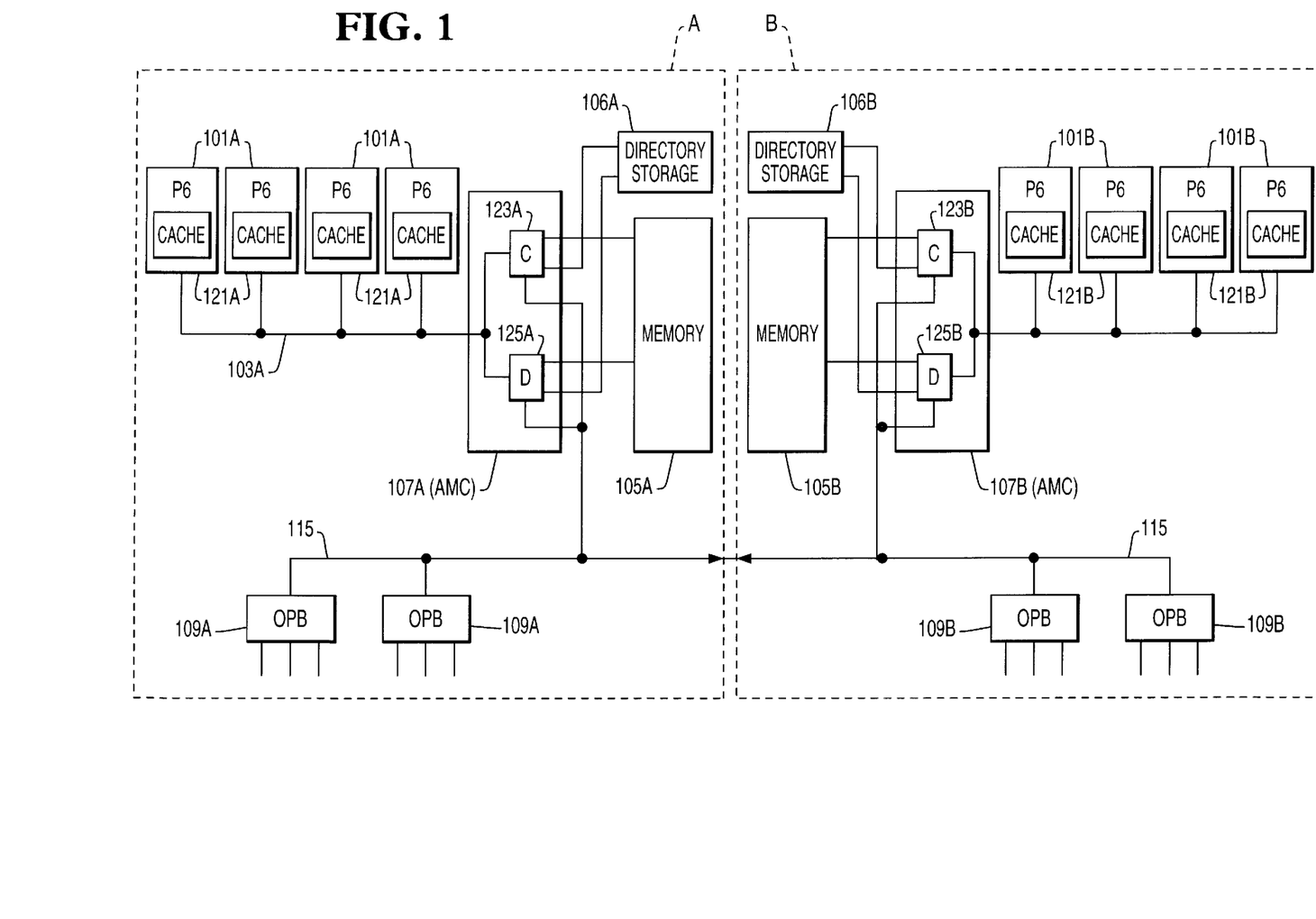
FIG. 1 is a simple block diagram representation of an eight-processor super high volume (SHV) symmetric multiprocessing (SMP) computer system employing currently available commodity components.

Referring now to FIG. 1, there is seen an eight-processor SMP system formed of two four-processor building blocks or complexes, identified by reference numerals A and B. Each complex is seen to include identical structure and components, which are identified by reference numerals ending in either an A or a B, for complex "A" and "B", respectively.

The portion of the system contained in complex A is seen to include up to four processors 101A connected to a high-bandwidth split-transaction processor bus 103A. Associated with each processor 301A is a cache memory 321A. A system memory 105A is connected to bus 103A through an advanced dual-ported memory controller 107A. The processor bus 103A is connected to the first port of memory controller 107A. The second memory controller port connects to a high bandwidth I/O bus 115, also referred to herein as an expansion bus, which provides connection for multiple PCI I/O interfaces 109A. All of these components, with the exception of advanced memory controller 107A, are currently available commodity components. For example, processors 101A may be Intel Pentium Pro processors and busses 103A and 115 may be Pentium Pro (P6) bus topology.

The advanced memory controller (AMC) 107A manages control and data flow in all directions between processor bus 103A and I/O bus 115. The I/O bus may contain P6 to PCI I/O Bridges and another AMC ASIC for connectivity to another processor bus, as will be discussed below. The AMC 107A also controls access to a coherent DRAM memory array. The AMC as presently implemented consists of a control and data slice ASIC pair.

As stated earlier, complex B has a construction identical to complex A. The two complexes are interconnected by expansion bus 115, allowing for communication between the processors 101A and 101B, system memories 105A and 105B, as well as shared I/O devices, cache memories, and other components.

Within each complex, the processors use a bus snooping protocol on the processor bus. Bus snooping is a method of keeping track of data movements between processors and memory. There are performance advantages to this system with a small number of tightly-coupled processors. If a processor needs data that is available in the data cache of another processor on the same bus, the data can be shared by both processors. Otherwise, the data must be retrieved from main memory 105A or 105B, a more time consuming operation which requires system bus traffic. This method enhances system performance by reducing system bus contention.

The characteristics of the NCR architecture shown in FIG. 1 include:

- Capitalizes on industry SHV architecture and supporting commodity chips (IOB. etc.)
- Dual ported memory controllers 107A and 107B permit connection and utilization of dual buses, each operating at 66 MHz with a bandwidth of 64 bits and capable of sustained data transfer rates of 533 MB/s.
- Dual bus approach provides greater scalability through a reduction of bus loadings and provision of a private processor to memory path that can operate independent of IOB to IOB traffic.
- Additional processors and I/O devices can be connected to the expansion bus 115.

The system as described is able to fill High Availability Transaction Processing (HATP) and Scaleable Data Warehouse (SDW) server needs, while capitalizing on the computer industry's SHV motion.

Memory-Based Coherency

In any system employing a data cache memory, and particularly a system employing multiple data cache memories and multiple levels of data cache memories, data from a given memory location can reside simultaneously in main memory and in one or more data cache memories. However, the data in main memory and in data cache memory may not always be the same. This may occur when a microprocessor updates the data contained in its associated data cache memory without updating the main memory and other data cache memories, or when another bus master changes data in main memory without updating its copy in the microprocessor data cache memories.

To track the data moving between the processors, system memory modules 105A and 105B, and the various data cache memories, the system utilizes a hybrid of memory and cache based coherency. Coherency between system memory and caching agents, i.e., system bus processors with first and possibly second level data caches, is maintained via a combination centralized/distributed directory-based cache coherency.

A directory-based cache coherency scheme is a method of keeping track of data movements between the processors and memory. With this approach to data coherency, a memory status table identifies which processors have which lines of memory in their associated data cache memories. When a processor requests data, the status table identifies the location within main memory or processor data cache where the most current copy of the data resides. The advantage of this method is that no additional work must be performed until a processor needs data that resides in a data cache that cannot be accessed through snooping. Directory-based cache coherency is most effective with a large number of tightly-coupled processors on a system bus.

The centralized/distributed directory-based cache coherency scheme employed in the system shown in FIG. 1 consists of two directory elements. The central element within the directory scheme resides in state cache memories 203A and 203B associated with system memory modules 105A and 105B, respectively. This element is referred to as the Memory Line Status Table (MLST). Each active (cached) memory line within system memory includes a corresponding entry in the MLST. This corresponding entry contains information indicating whether or not a memory line is cached, and if so, whether it is exclusively owned by one processor (or bus), or shared across multiple processors (or buses). The directory scheme and MLST can be set up to identify memory line ownership by system bus or by processor. The "bit-per-bus" MLST distinguishes ownership on a bus basis, while the more granular "bit-per-processor" MLST distinguishes ownership on a processor basis. Note that the distinction is specific to a memory design and hence transparent to any other device on the system bus.

Distributed directory elements reside locally within each processor's data cache directory. The element associated with a particular processor is referred to as its Processor Line Status Table (PLST). Each cache line has a corresponding entry in the PLST. From the local processor's perspective, this entry contains information indicating whether or not a line contains a valid copy of a main memory line, and if so, whether or not modifications to that line must be broadcast to the rest of the system. From the system's perspective, each processor's PLST is a slave to special system bus cycles known as Memory Intervention Commands (MICs). These cycles query the PLST as to the local state of a particular line, and/or tell the PLST to change that local state.

Memory and Cache State Definitions

The Modified-Exclusive-Shared-Invalid (MESI) cache coherency protocol is a hardware-implemented protocol for maintaining data consistency between main memory and data cache memories. A typical implementation of the MESI hardware cache coherency protocol requires the utilization of cache controllers having the ability to:
1. use the same line size for all caches on the memory bus;
2. observe all activity on the memory bus;
3. maintain state information for every line of cache memory; and
4. take appropriate action to maintain data consistency within the cache memories and main memory.

MESI represents four states which define whether a line is valid, if it is available in other caches, and if it has been modified. Each line of data in a data cache includes an associated field which indicates whether the line of data is MODIFIED, EXCLUSIVE, SHARED, or INVALID. Within the Processor Line Status Table each cache line is marked in one of the four possible MESI states:

MODIFIED (PM)—This state indicates a line of data which is exclusively available in only this cache, and is modified. Modified data has been acted upon by a processor. A Modified line can be updated locally in the cache without acquiring the shared memory bus. If some other device in the system requires this line, the owning cache must supply the data.

EXCLUSIVE (PE)—This state indicates a line of data which is exclusively available in only this cache, that this line is not Modified (main memory also has a valid copy), and that the local processor has the freedom to modify this line without informing the system. Exclusive data can not be used by any other processor until it is acted upon in some manner. Writing to an Exclusive line causes it to change to the Modified state and can be done without informing other caches, so no memory bus activity is generated. Note that lines in the (PE) state will be marked (MO) in the MLST, as will be described below.

SHARED (PS)—This state indicates a line of data which is potentially shared with other caches (the same line may exist in one or more caches). Shared data may be shared among multiple processors and stored in multiple caches. A Shared line can be read by the local processor without a main memory access.

When a processor writes to a line locally marked shared, it must broadcast the write to the system as well.

INVALID (PI)—This state indicates a line of data is not available in the cache. Invalid data in a particular cache is not to be used for future processing, except diagnostic or similar uses. A read to this line will be a "miss" (not available). A write to this line will cause a write-through cycle to the memory bus. All cache lines are reset to the (PI) state upon system initialization.

In accordance with the MESI protocol, when a processor owns a line of memory, whether modified or exclusive, any writes to the owned line of memory within main memory will result in an immediate update of the same data contained within the processor's data cache memory.

The Memory Line Status Table marks a memory line in one of three possible states: NOT CACHED (MNC), SHARED (MS), and OWNED (MO). The letter M distinguishes these states from PLST states, which are identified by use of the letter P. Additionally there are bus and/or processor state bits indicating sharing or ownership on either a bus or processor basis.

NOT CACHED (MNC): Indicates that no cache has a copy of that line. All memory lines must be reset to the (MNC) state upon system initialization.

SHARED STATE (MS): Indicates that one or more caches potentially have a copy of that line.

OWNED STATE (MO): Indicates that one and only one cache potentially has a copy of that line, and that the data in memory potentially does not match it (Memory data is referred to as stale).

Note the word "potentially" used in the definition of the shared and owned states. There are several situations in which the MLST does not have the most up-to-date information about a particular memory line. For example, the MLST may mark a line as shared by two particular processors since it saw them both read it. However, both processors may have long since discarded that line to make room for new data without informing the MLST (referred to as "silent replacement"). The MLST will naturally "catch up" to the latest state of a particular line whenever an access to that line by some master forces a MIC. In this example, a write by a third processor to this line will initiate a (now superfluous) MIC to invalidate other cached copies, and will bring the MLST up-to-date. Note however that the MLST always holds a conservative view of the state of cache lines. That is, a line that is owned or shared by a processor will always be marked correctly in the MLST. "Stale" information in the MLST takes the form of lines marked owned or shared that are no longer present in any processor's data cache.

There are three distinct MIC operations employed within the system described above in order to maintain coherency between system memory and the data cache memories:

INVALIDATE (MBI) This cycle is initiated to cause all data caches with an addressed line to go to the invalid state (PI). It normally occurs in response to certain memory operations that access a line marked shared (MS) in the MLST. Unlike the other MIC operations, an MBI does not require feedback from any PLST as to the current state of the addressed line in a local cache. Rather, the MBI simply requests invalidation of a line if it is present in the cache. Although an MBI requires no logical feedback, it does require a positive acknowledgment from the targeted processor(s) to complete the cycle. This simply indicates that the processor has accepted the invalidate address and is ready for another.

CASTOUT INVALIDATE (MBCOI) This cycle is initiated to cause a cache with a potentially modified copy of an addressed line to cast it out to system memory and to go to the invalid state (PI). It occurs in response to certain memory operations that access a memory line marked owned (MO) in the MLST. If the owning cache has the line in the modified (PM) state, it supplies the data and goes invalid. If the owning cache has the line in the exclusive (PE) state, it acknowledges the MBCOI and goes invalid, but does not supply the data. If the owning cache no longer has the line it simply acknowledges the MBCOI to complete the cycle.

CASTOUT SHARED (MBCOS) This cycle is to cause a cache with a potentially modified copy of an addressed line to cast it out to system memory and to go to the shared state (PS). It occurs in response to certain memory operations that access a memory line marked owned (MO) in the MLST. If the owning cache has the line in the modified (PM) state, it supplies the data and goes to shared. If the owning cache has the line in the exclusive (PE) state, it acknowledges the MBCOS and goes to shared, but does not supply the data. If the owning cache no longer has the line it acknowledges the MBCOS to complete the cycle. Note that in the last case the MLST goes to shared (MS) even though the line is not cached. This is because the MLST cannot distinguish a line that is exclusive (PE) in the owner's cache from a line that is invalid (PI).

As stated above, the MLST includes additional bus and/or processor state bits indicating sharing or ownership on either a bus or processor basis.

The Bit-per-Bus Protocol uses three memory state bits per line to indicate the current state of the line. One bit indicates shared or owned, and the other two depict which bus (A or B) or buses (A and B) have the line shared or owned. Bus ownership indicates that one of the processors on that bus owns the line. Six states are possible: UNCACHED, SHARED BUS A, SHARED BUS B, SHARED BOTH, OWNED BUS A and OWNED BUS B. Note that a line can be owned by only one processor and therefore by only one bus. A shared line can be shared by one or more processors on each bus.

TABLE 1

Memory State Bits for Bit-per-Bus Protocol

| OBA | STATE BIT DEFINITIONS | DESCRIPTION |
|-----|----------------------|-------------|
| 000 | MNC - Not Cached; | Not owned or shared |
| 001 | MS - Shared; | Shared on Bus A |
| 010 | MS - Shared; | Shared on Bus B |
| 011 | MS - Shared; | Shared on Buses A and B |
| 100 | x - (not a valid state) | |
| 101 | MO - Owned; | Owned by Bus A |
| 110 | MO - Owned; | Owned by Bus B |
| 111 | x - (not a valid state) | |

The Bit-per-Processor Protocol has an MLST consisting of n+1 bits per line (n is equal to the number of processors) to indicate the current state of that line. One bit indicates whether the line is shared (MS) or owned (MO), and the other n bits depict which processor or processors have the line cached. A particular processor is numbered Pi, where i=0 to n−1. All Pi, where i is even, are on bus A, and all Pi, where i is odd, are on bus B. Processor ownership indicates which processor (only one) owns the line. A shared line can be shared by one or more processors on either or both buses.

TABLE 2

Memory State Bits for Bit-per-Processor Protocol

| O | P0 ... Pn − 1 | STATE BIT DEFINITIONS |
|---|---------------|----------------------|
| 0 | all zeros | MNC - Not Cached |
| 0 | one or more set | MS - Shared |
| 1 | only one set | MO - Owned |
| 1 | more than one set | x - (not a valid state) |
| 1 | all zeros | x - (not a valid state) |

Memory State Cache

As described earlier, the MLST containing state information associated with system memory 105A or 105B is maintained within state cache memories 203A and 203B, respectively. The state cache memories are sized to store state information for only a portion of the memory lines included in system memory in recognition that rarely will all of system memory be utilized (cached) at any one time. The structure and operation of an exemplary state cache memory 203A is illustrated in FIGS. 2 and 3.

Figure 2:
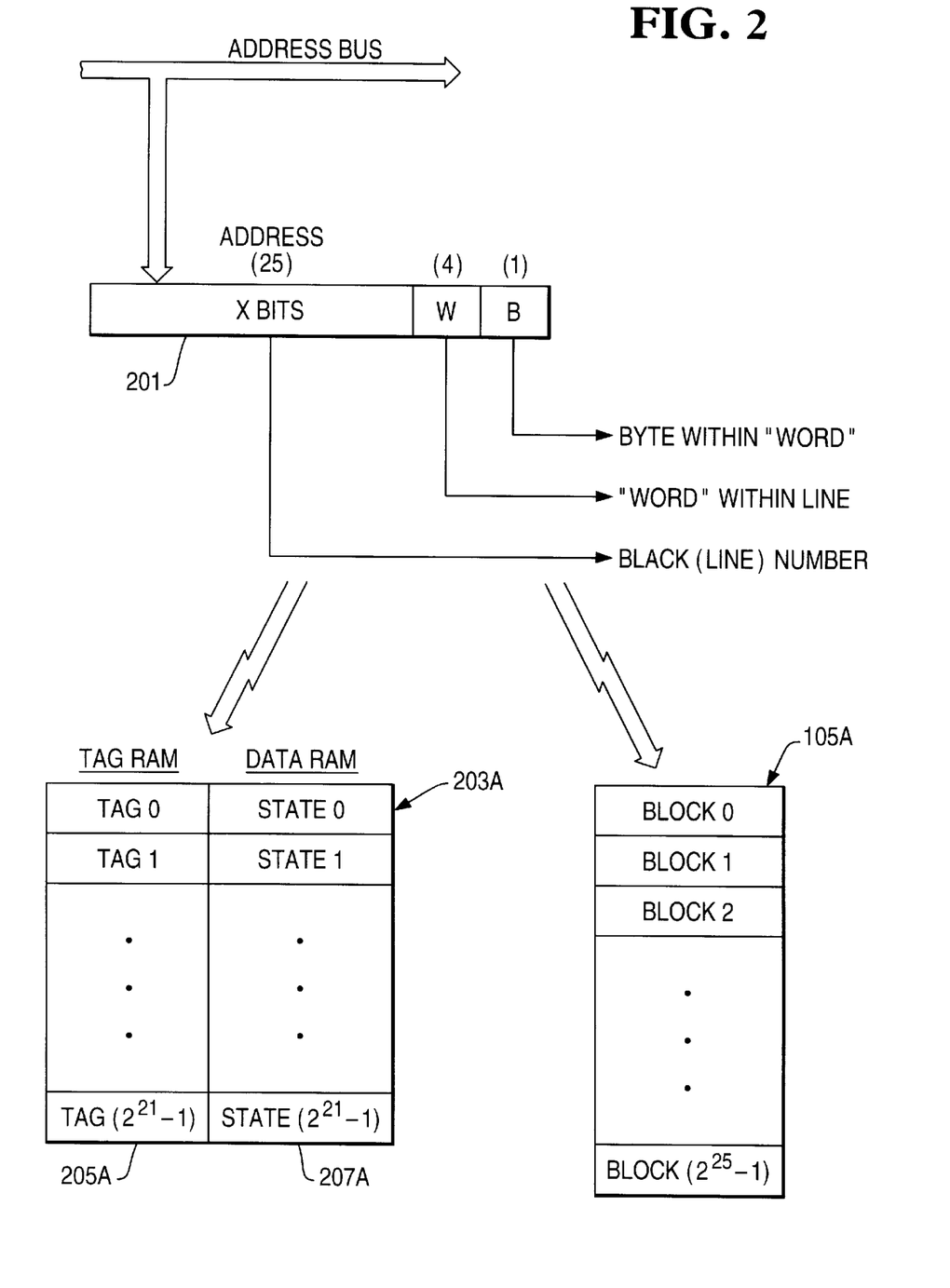
FIG. 2 is a block diagram representation of system memory 105A and a cache memory for the storage of state information.
Figure 3:
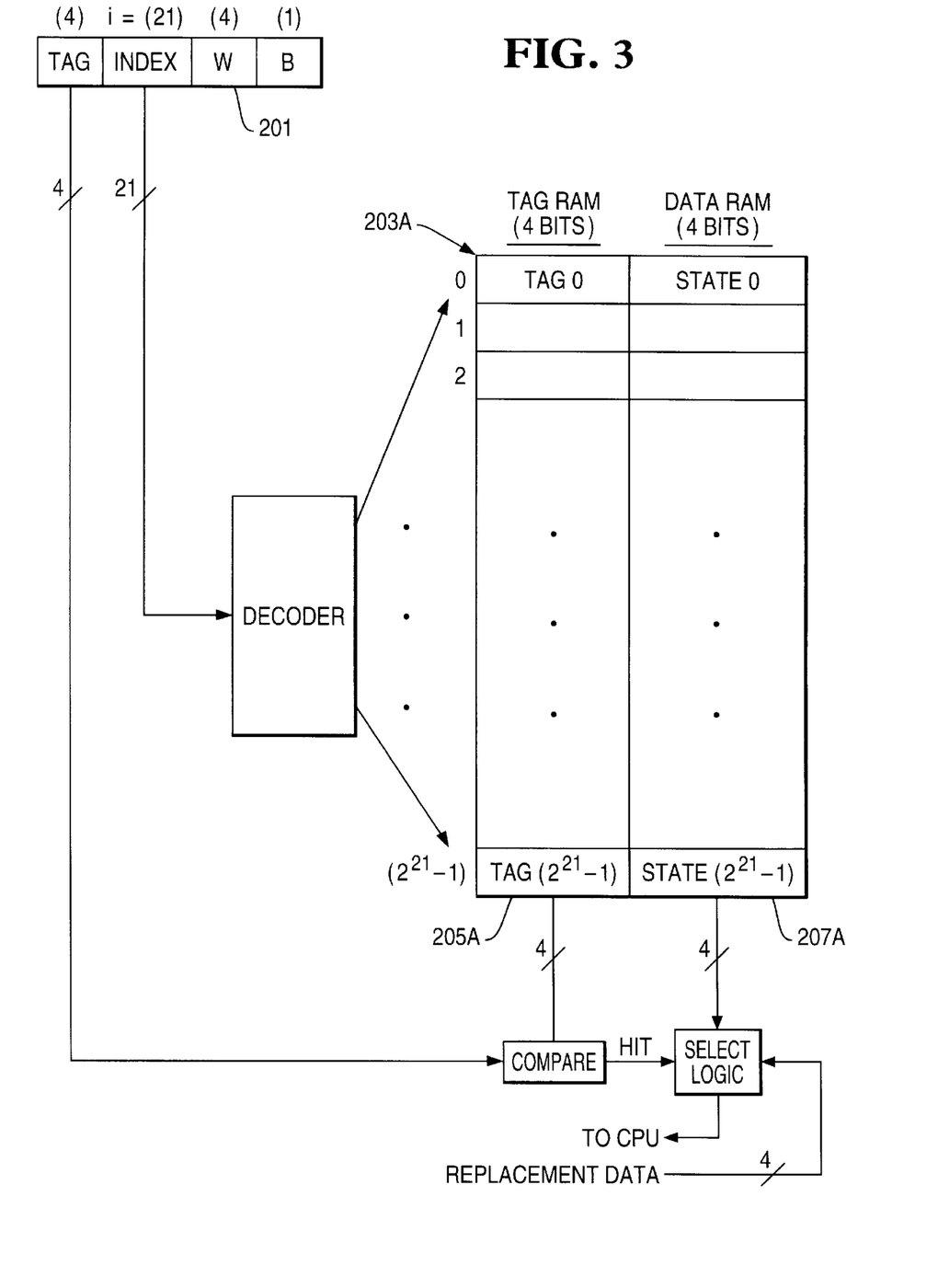
FIG. 3 is a block diagram representation of state cache memory 203 of FIG. 2 providing more detail concerning the structure and operation of state cache 203.

FIG. 2 shows system memory 105A having a size, for example, of one gigabyte ($2^{29}$ bytes) divided into 33,554,432 ($2^{25}$) million memory blocks or lines, each line having a size of 32 bytes. Data stored within memory 105A is accessed by submitting a 29-bit address 201. The 25 most significant bits within the address, identified as "X" bits, identify the memory block or line number. The next 4 address bits, identified as "W" bits, point to the word within the memory block, while the least significant address bit "B" identifies the byte within a word.

The cache memory 203A providing for the storage of state information includes two sections identified as the "cache tag RAM" 205A and the "cache data RAM" 207A. Each line entry within state cache memory 203A contains state information saved to the cache data RAM and a four bit tag stored within the cache tag RAM.

State cache memory 203A is indexed by a subset of the total number of memory address bits. The remainder of the address bits, or tag bits, are part of the contents for each entry in the storage device. The index bits define the number of entries in the state cache, and the tag bits determine the number of memory lines which can contend for the same entry in the state cache. The index bits plus the tag bits define the total number of memory lines which can be supported. In essence, the reduction in state storage is defined by the number of tag bits. For example, if the number of tag bits is four, then the state storage requirements for this concept are one sixteenth that of the traditional architecture.

More detailed information concerning the structure and operation of the state cache 203A is shown in FIG. 3. Entries within the state cache are accessed by submitting the same address 201 used to access main memory 105A. The four most significant bits within the address are identified as tag bits, and the next 21 address bits are identified as index bits. These 25 address bits are the same bits identified as X bits in FIG. 4, and which are used to identify memory blocks within main memory 105A.

During a state cache read operation, the index field of the address is used to specify the particular entry or line of cache to be checked. Next, the tag bits of the address are compared with the tag of the selected cache line. If there is a match, a cache hit occurs and the state bits associated with the selected cache line are retrieved.

To store state information within the state cache memory, the index field of an address is used to identify a particular entry or line of cache for tag and state information storage. The first four address bits are saved to the cache tag RAM while the state information associated with the address are saved to the cache data RAM. Optionally, error detection and/or correction syndrome bits or parity bits could be included in the state cache memory.

The state cache, as described, is a direct mapped cache. Note, however, that the state cache can be associative, sectored, or direct mapped as with data caches.

The operation of the memory system is as follows: When a read or write operation is requested of the system memory, the state cache is accessed to determine the coherency cycles necessary, dependent on the protocol. If the tag information in the state cache match the corresponding bits of the memory address, then the corresponding coherency cycles are performed and the state updated. If there is not a tag match, then coherency operations for the default state are performed (possibly none), and the new line address and state are allocated to the state cache. Possibly an existing entry will be replaced by the new line. Coherency operations may be required to bring the replaced line state to the default state. These replacement coherency operations are the performance cost for reducing the amount of state storage, but as mentioned above are negligible for a reasonable state cache size and typical workload. Note that the state cache can be associative, sectored, or direct mapped as with data caches.

The memory space saving provided though use of a state cache memory is illustrated in the following example. Consider the system, described earlier, having one gigabyte of memory and a 4-bit coherency state field required per line of memory. The basic coherency block or line of memory is 32 bytes. To store the 4 bit state for all of memory would require 16 MB of state memory (32 million lines times 4 bits per line). If each entry in the state memory contains a 4 bit tag, the state memory would contain 8 bits of information per line which is double the traditional amount. However, only one sixteenth as many lines are needed due to the 4 bit tag. Therefore, the total state memory required is 2 MB which is only one eighth of the traditional amount. The tradeoff is possible replacements of the state cache entries which are relatively few. In this example, the state cache is equivalent to a 64 MB data cache (2 million entries, each representing 32 byte lines).

One disadvantage which arises from the utilization of a memory state cache as above-described process is that additional coherency actions resulting from replacements of cached state entries may interfere with normal transfers. The present invention provides a method for reducing the number of coherency operations caused as a result of replacements in a directory based memory state cache.

Reduction of Replacement Operations

As stated earlier, when information about an address which is not stored in the state cache is needed, a previously stored state cache entry must be replaced to allow allocation of the new address. The current state of the art protocols restore the system state of the memory line (basic coherency element) to noncached (not shared or owned). This involves invalidate and castout operations to the processor data caches.

In the directory based cache coherency system thus far described, and in many similar systems, it should be recognized that most state cache lines are marked as shared after a warm-up period. It is thereby possible to reduce the number of coherency operations as a result of replacements by defining a default memory state of shared. Thus the replacement algorithm employed to handle operations resulting from replacements of cached state entries must only insure the shared state. Since most lines of cache are in the shared state this means no invalidates, and the data caches continue to retain the memory information in the shared state. If the replaced line is in an owned state, then a castout operation will be generated, but again the line can transition to the shared state in the data caches.

The tradeoff for this method is that when a line is allocated to the state cache in an ownership state (caused by write misses), invalidates will be necessary to all the possible sharers of that line in all the data caches. However, write and read misses cause allocates which cause replacements. If less than half the number of misses are write cycles then there will be more replacement invalidates saved than invalidates caused by write cycles since read cycles allocate shared entries in the cache.

Figure 4:
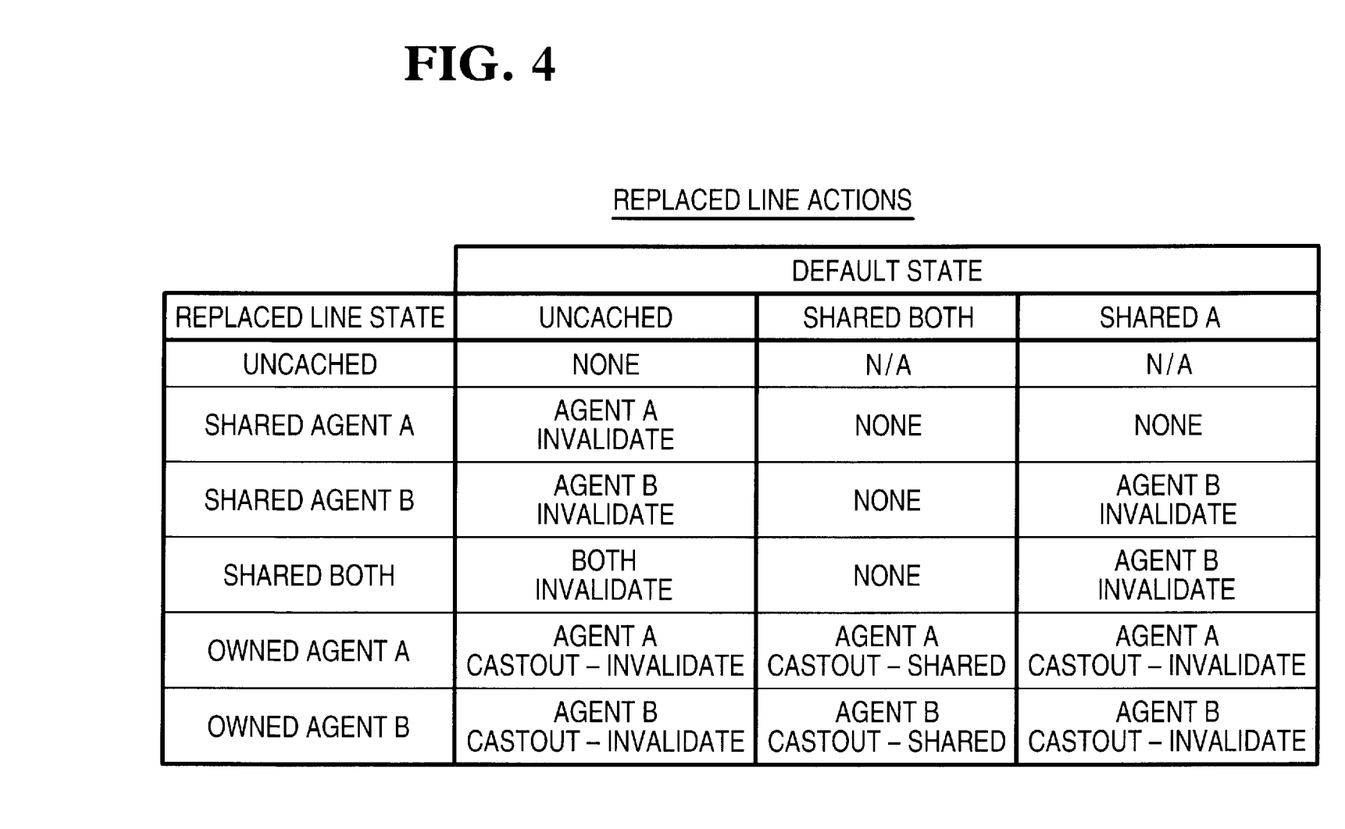
FIG. 4 is a table illustrating reductions in replacement memory line coherency operations for three possible default memory line states in accordance with the present invention.

As an example, consider a directory based memory system with 3 bits of state information per memory line (coherency element) for two caching agents. Six of the eight possible states typically used are: uncached, shared agent A, shared agent B, shared both, owned agent A, and owned agent B. FIG. 4 provides a table showing the replaced line operations for the traditional algorithm and the claimed method with a "Shared Both" or a "Shared Only" default state. Note a shared agent A or shared agent B default has merit if one agent has faster or higher priority access to memory; thus invalidates would be quicker for allocates to the state cache.

Figure 5A:
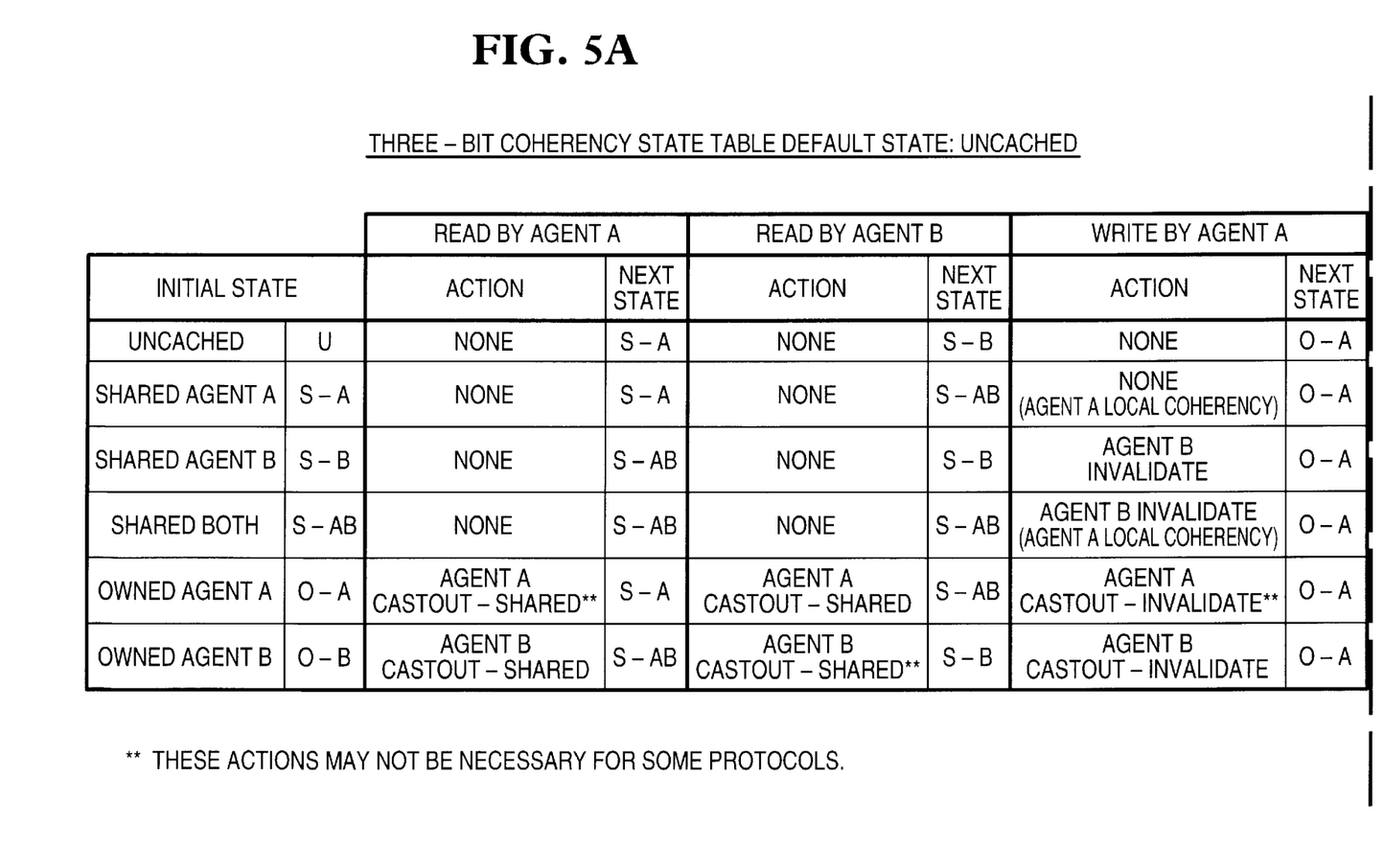
FIGS. 5A and 5B provide a coherency state table for a three bit directory based memory having an "Uncached" default state in accordance with a traditional replacement procedure.
Figure 5B:
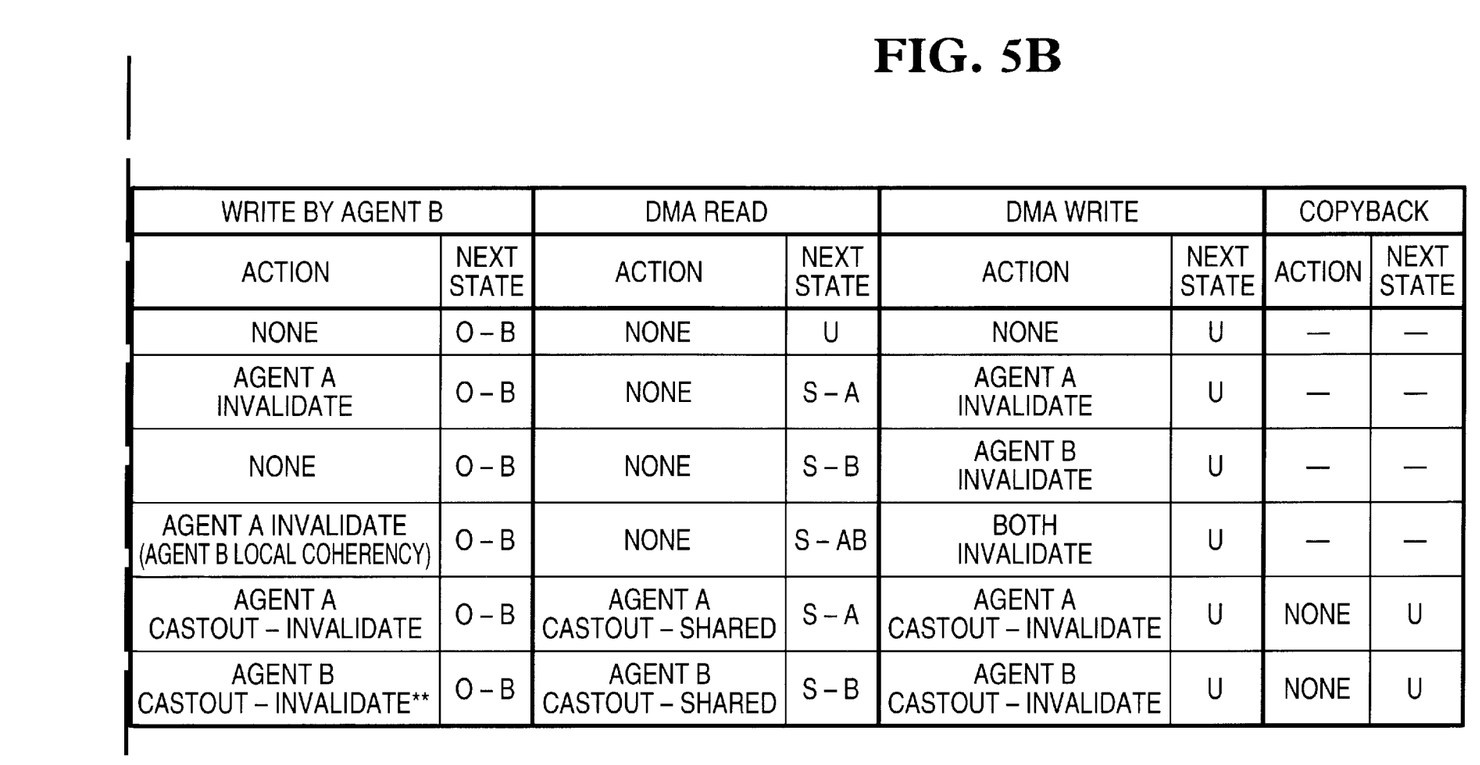
Figure 6A:
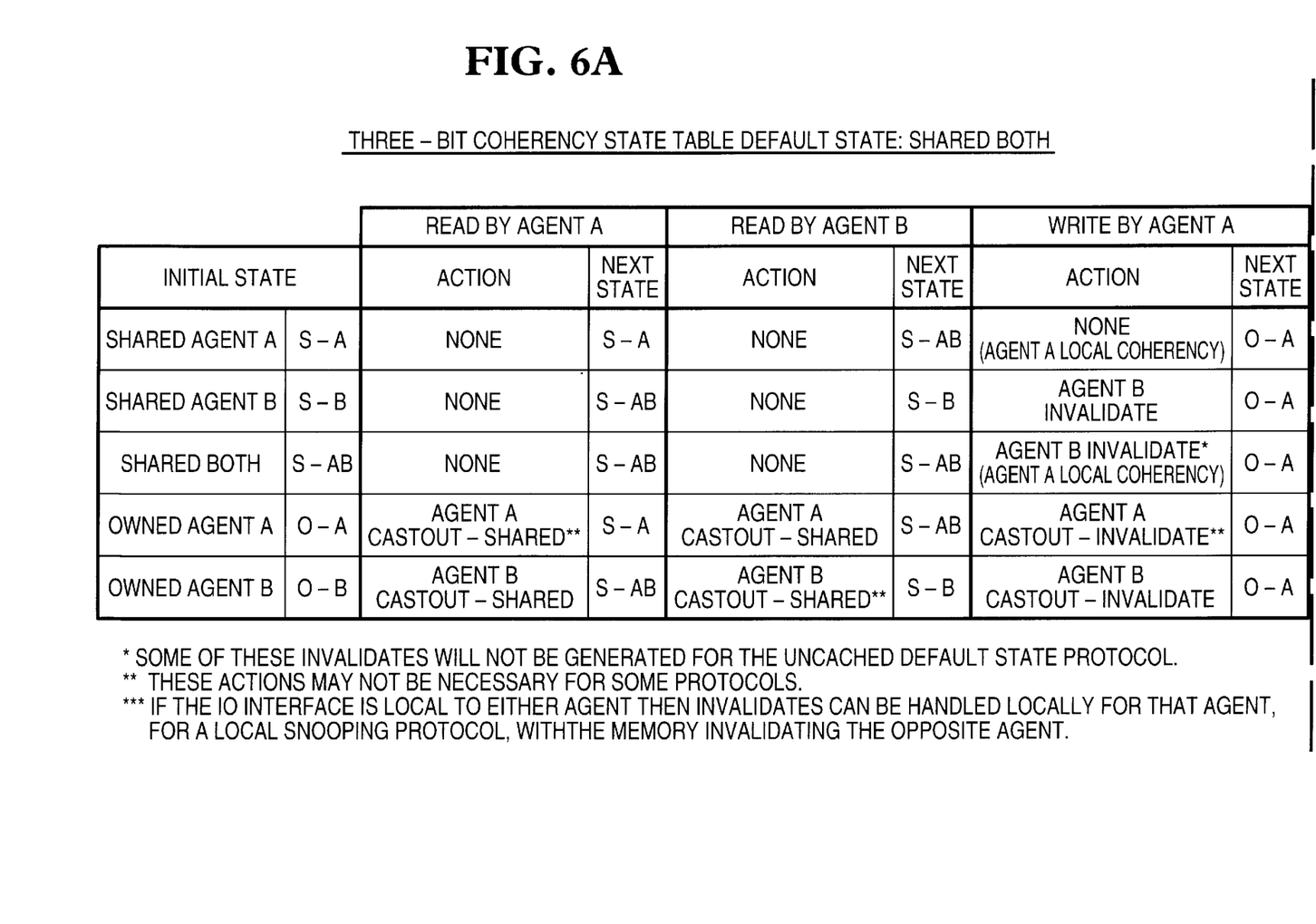
Figure 6B:
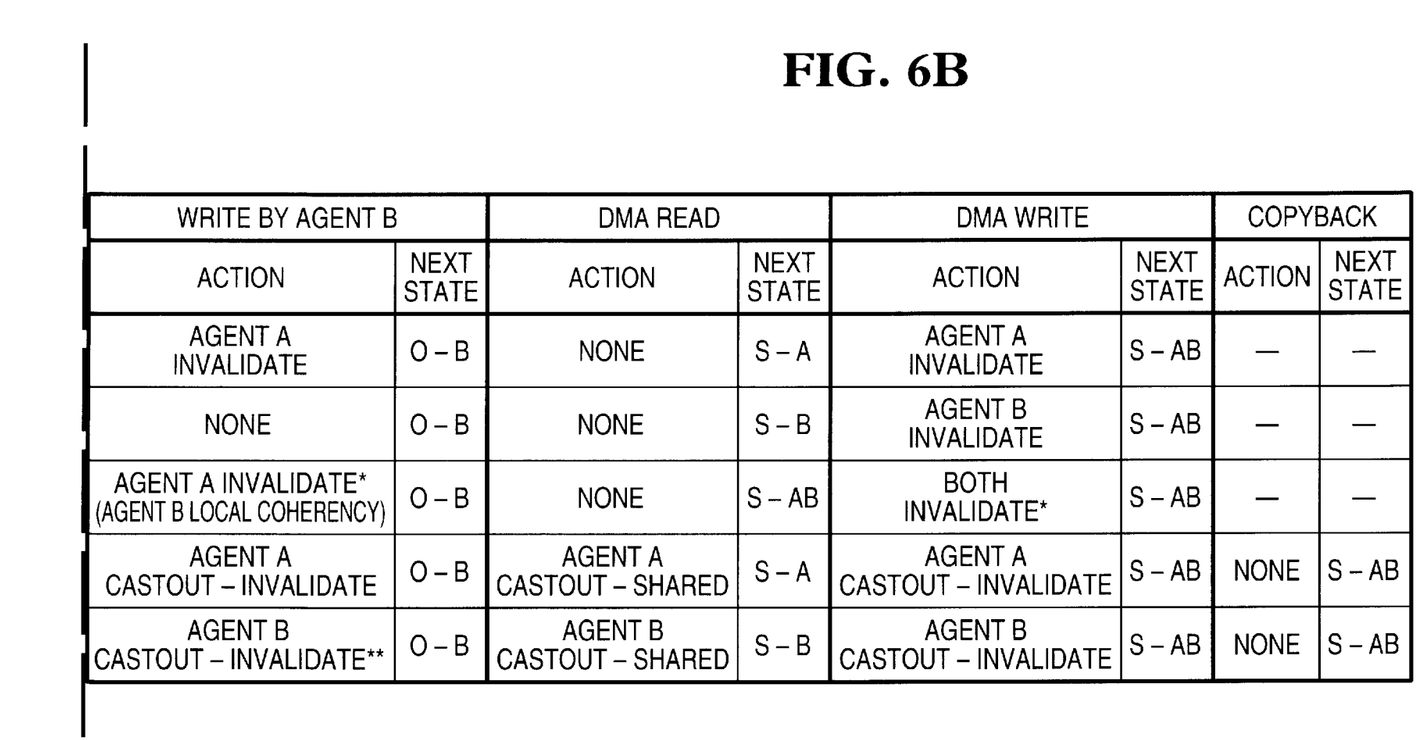
Figure 7A:
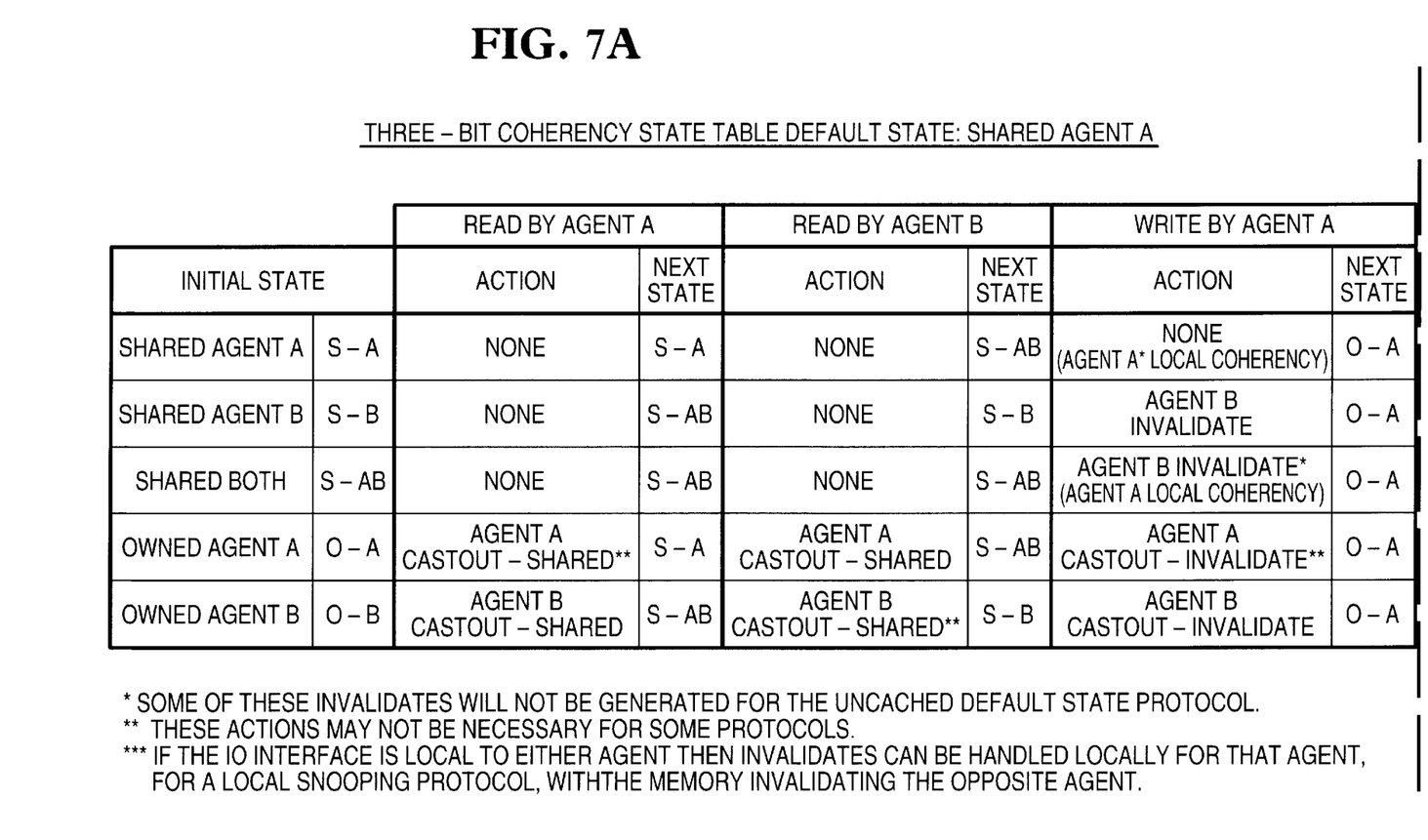
FIGS. 7A and 7B provide a coherency state table for a three bit directory based memory having a "Shared Agent A" default state in accordance with a second embodiment of the present invention.
Figure 7B:
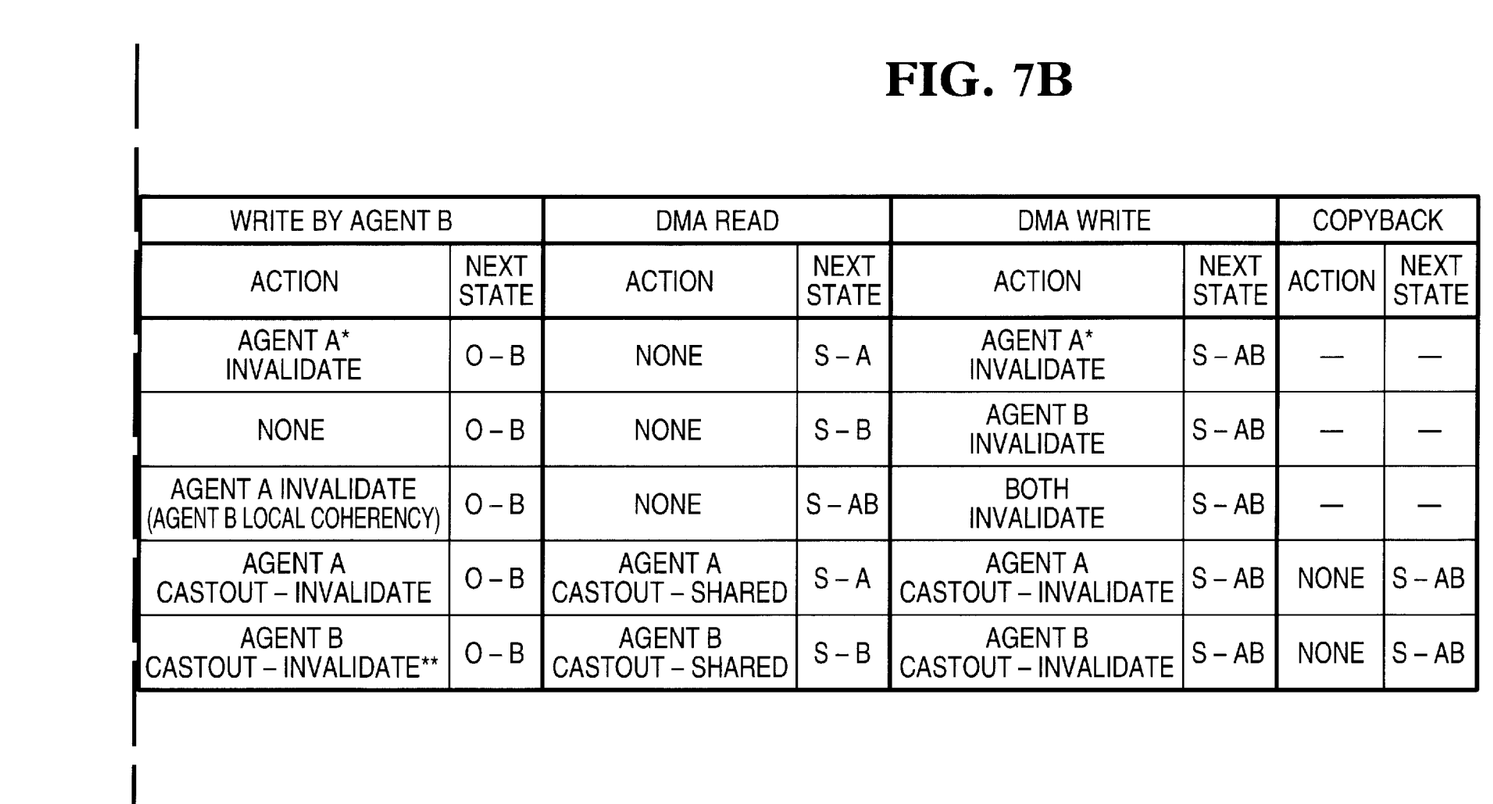

For the Shared Both default state protocol, replacement actions are required only if the entry is in an ownership state, and the agents are allowed to keep the lines in the shared state locally. For the "shared A" default state protocol, invalidates are required to agent B if the line is "Shared by Agent B" or "Shared by Both". However, less extra invalidates are required while allocating to the state cache for this case. The table provided by FIGS. 5A and 5B shows the coherency state table for a three-bit directory based memory with an uncached default state. The tables shown in FIGS. 6A–6B and 7A–7B show the coherency states for "Shared Both" and "Shared Agent A" default states. The states which cause some additional invalidates are shown in bold font. For the "Shared Both" default case, a write miss will cause an invalidate to the opposite agent and a DMA write will cause invalidates to both agents. For the "Shared A" default case, a write miss by agent A will only cause a local coherency cycle, and a DMA write will only invalidate agent A. Therefore less invalidates occur for this case. (Note: if the I/O interface is local to either agent then invalidates can be handled locally for that agent, for a local snooping protocol, with the memory invalidating the opposite agent).

It can thus be seen that there has been provided by the present invention a new and useful method for improving memory utilization within a computer system employing centralized/distributed directory-based cache coherency and a state cache memory. The described method reduces the number of coherency (invalidate) operations caused as a result of replacements in the state cache memory.

Although the presently preferred embodiment of the invention has been described, it will be understood that various changes may be made within the scope of the appended claims.

What is claimed is:

1. In a multiprocessor computer system including a shared system memory, a state cache memory, a plurality of data cache memories, a system of busses interconnecting said system memory with said plurality of data cache memories, and employing a centralized/distributed directory-based cache coherency system for maintaining consistency between lines of memory within said shared system memory and said plurality of data cache memories; a method for replacing entries within said state cache memory, said method comprising the steps of:

establishing a default system memory line state of SHARED for lines of memory represented in said state cache memory;

reading the system memory line state for a previously stored state cache entry prior to a replacement of said previously stored state cache entry, said previously stored state cache entry being associated with a line of memory stored in said shared memory and at least one data cache memory;

performing a castout operation to update the line of memory within said shared memory and assigning a data cache memory line state of SHARED to said line of memory in each data cache memory containing said line of memory if said system memory line state for said previously stored state cache entry is OWNED.

2. In a centralized/distributed directory-based cache coherency system within a computer system including multiple processors; a data cache memory associated with each processor, each one of said data cache memories containing a data cache memory line state with each line of memory saved within said data cache memories, said data cache memory line state being any one of the group: MODIFIED, EXCLUSIVE, SHARED, or INVALID; a system memory shared by said multiple processors, a state cache memory, said state cache memory containing a system memory line state for a predetermined number of lines of memory saved within said system memory, said system memory line state being any one of the group: SHARED BUS A, SHARED BUS B, SHARED BOTH, OWNED BUS A and OWNED BUS B; and first (BUS A) and second (BUS B) memory busses, each memory bus connecting a subset of said multiple processors and associated data cache memories; said system memory and said state cache memory; a method for replacing entries within said state cache memory, said method comprising the steps of:

reading the system memory line state for a previously stored state cache entry prior to a replacement of said previously stored state cache entry, said previously stored state cache entry being associated with a line of memory stored in said shared memory and at least one data cache memory;

performing a castout operation to update the line of memory within said shared memory and assigning a data cache memory line state of SHARED to said line of memory in each data cache memory containing said line of memory if said system memory line state for said previously stored state cache entry is OWNED BUS A; and performing a castout operation to update the line of memory within said shared memory and assigning a data cache memory line state of SHARED to said line of memory in each data cache memory containing said line of memory if said system memory line state for said previously stored state cache entry is OWNED BUS B.

3. In a centralized/distributed directory-based cache coherency system within a computer system including multiple processors; a data cache memory associated with each processor, each one of said data cache memories containing a data cache memory line state with each line of memory saved within said data cache memories, said data cache memory line state being any one of the group: MODIFIED, EXCLUSIVE, SHARED, or INVALID; a system memory shared by said multiple processors, a state cache memory, said state cache memory containing a system memory line state for a predetermined number of lines of memory saved within said system memory, said system memory line state being any one of the group: SHARED BUS A, SHARED BUS B, SHARED BOTH, OWNED BUS A and OWNED BUS B; and first (BUS A) and second (BUS B) memory busses, each memory bus connecting a subset of said multiple processors and associated data cache memories; said system memory and said state cache memory; a method for replacing entries within said state cache memory, said method comprising the steps of:

establishing a default system memory line state of SHARED BUS A for lines of memory represented in said state cache memory;

reading the system memory line state for a previously stored state cache entry prior to a replacement of said previously stored state cache entry, said previously stored state cache entry being associated with a line of memory stored in said shared memory and at least one data cache memory;

performing an invalidate operation to assign a data cache memory line state of INVALID to said line of memory in each data cache memory connected to said second memory bus (BUS B) containing said line of memory if said system memory line state for said previously stored state cache entry is SHARED BOTH;

performing an invalidate operation to assign a data cache memory line state of INVALID to said line of memory in each data cache memory connected to said second memory bus (BUS B) containing said line of memory if said system memory line state for said previously stored state cache entry is SHARED BOTH;

performing a castout operation to update the line of memory within said shared memory and assigning a data cache memory line state of SHARED to said line of memory in each data cache memory containing said line of memory if said system memory line state for said previously stored state cache entry is OWNED BUS A; and performing a castout operation to update the line of memory within said shared memory and assigning a data cache memory line state of SHARED to said line of memory in each data cache memory containing said line of memory if said system memory line state for said previously stored state cache entry is OWNED BUS B.

* * * * *